(12) United States Patent
Fernando et al.

(10) Patent No.: US 6,754,748 B2
(45) Date of Patent: Jun. 22, 2004

(54) METHOD AND APPARATUS FOR DISTRIBUTING MULTI-SOURCE/MULTI-SINK CONTROL SIGNALS AMONG NODES ON A CHIP

(75) Inventors: John Susantha Fernando, Coopersburg, PA (US); Hyun Lee, Ladera Ranch, CA (US); Trevor Edward Little, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 566 days.

(21) Appl. No.: 09/785,602

(22) Filed: Feb. 16, 2001

(65) Prior Publication Data

US 2002/0116560 A1 Aug. 22, 2002

(51) Int. Cl.[7] .......................... G06F 1/04; G06F 13/42; G11C 13/00
(52) U.S. Cl. ....................... 710/100; 713/500
(58) Field of Search ................. 710/100, 105, 710/305; 326/93; 713/400, 500, 323; 365/233, 230.01; 327/100, 142, 518; 711/100

(56) References Cited

U.S. PATENT DOCUMENTS 5,185,719 A * 2/1993 Dhong et al.
6,002,615 A * 12/1999 Sawada
6,201,437 B1 * 3/2001 Kono et al.
6,487,671 B1 * 11/2002 Munoz-Bustamante

OTHER PUBLICATIONS

"A high-speed ultra-low power 64K CMOS EPROM with on-chip test functions" By M.W.Knecht, M.H.Manley, D.C.Perasso, J.F Thomas, P.Keshtbod, N. Tandan and G.H.Simmons (abstract only).*

"DSA 4K static RAM" by Y.Torimaru, K.Miyano and H.Takeuchi (abstract only).*

* cited by examiner

Primary Examiner—Gopal C. Ray

(57) ABSTRACT

A method and apparatus are described for distributing multi-source/multi-sink control signals among nodes on a chip. Each node on the chip assists in returning the control signal to an inactive state at the start of each cycle. Thus, since all nodes contribute to returning the control signal to the inactive state, the control signal returns to the inactive state more quickly, near the start of a given cycle, and the remainder of the cycle remains available for a given node to drive the control signal. Each node includes an exemplary pulsed reset block that discharges the control signal network closest to it for a short interval, and over time the rest of the network, returning the network to an inactive state. Once the control signal network has been returned to an inactive state, the control signal may then be driven by a node during the remainder of the cycle.

21 Claims, 4 Drawing Sheets

METHOD AND APPARATUS FOR DISTRIBUTING MULTI-SOURCE/MULTI-SINK CONTROL SIGNALS AMONG NODES ON A CHIP

CROSS-REFERENCE TO RELATED APPLICATIONS

The present invention is related to U.S. patent application No. 09/785,604 entitled "Method and Apparatus for Distributing a Self-Synchronized Clock to Nodes on a Chip," U.S. patent application No. 09/788,582 entitled "Method and Apparatus for Transferring Multi-Source/Multi-Sink Control Signals Using a Differential Signaling Technique," U.S. patent application No. 09/785,653 entitled "Bidirectional Bus Repeater for Communications on a Chip," and U.S. patent application No. 09/785,592 entitled "On-Chip Method and Apparatus for Transmission of Multiple Bits Using Quantized Voltage Levels," each filed contemporaneously herewith, assigned to the assignee of the present invention and incorporated by reference herein.

FIELD OF THE INVENTION

The present invention relates generally to communications on a single chip, and more particularly, to methods and apparatus for distributing multi-source/multi-sink control signals among various nodes on a chip.

BACKGROUND OF THE INVENTION

Address and data busses provide data paths that are shared by a number of data processing devices, such as memory devices, micro-controllers, microprocessors, digital signal processors (DSPs) and peripheral devices. Busses are typically formed on printed circuit boards (PCBs) and interconnect the various devices mounted on the PCB. The busses may also extend to connectors in order to allow external devices to be coupled to the bus.

Recently, integrated circuit (IC) manufacturers have begun producing single chips containing multiple device cores, such as multiple memory devices, micro-controllers, microprocessors and digital signal processors (DSPs), that were traditionally mounted on a PCB and interconnected by one or more busses on the PCB. Such a single chip is commonly referred to as a system-on-a-chip (SoC). SoCs incorporate one or more busses to provide data paths to interconnect the multiple core devices on the chip, often referred to as "nodes." The busses on SoCs, however, comprise conductor traces on the chip and thus tend to be much shorter in length and less sensitive to noise than PCB busses.

As SoCs grow in size and complexity, it becomes increasingly difficult to communicate control signals among the various nodes on the SoC, primarily due to the resistive-capacitive (RC) delays attributed to the conductor length. Within each node on the SoC, increasing clock rates can be achieved using phase locked loop (PLL) or digital delay line (DDL) circuits (or both). It is also highly desirable to perform inter-node communications at the same internal clock rate used by each node. FIG. 1 is a schematic block diagram illustrating a conventional SoC 100 having a bus 110 that interconnects the various nodes 120-1 through 120-N (multiple core devices), collectively referred to as nodes 120, on the chip 100. As previously indicated, the nodes 120 may be embodied, for example, as memory devices, micro-controllers, microprocessors and digital signal processors (DSPs).

When an SoC 100 includes multiple nodes 120 communicating over a common bus 110, an Arbiter 150 is often used to determine which node 120 should actively drive the bus 110 at a particular time. Multi-source/multi-sink control signals, such as acknowledgement (ACK), data-valid, interrupt and error signals, are often employed to control communications on the SoC bus 110. All of the various nodes 120 and the Arbiter 150 typically operate synchronously with respect to a common clock 160, and ideally transfers on the bus would occur within one clock period.

When a given node 120 desires to communicate on the common bus 110, the node 120 sends a unidirectional request signal (REQn) to the Arbiter 150, and receives back a unidirectional grant signal (GNTn) from the Arbiter 150 that allows the node 120 to drive onto the bus wires in the next cycle. One condition for getting a GNTn signal is that the receiving node 120-R that is to receive the data has signaled to the Arbiter 150 that the receiving node 120-R is ready to accept data. After the GNTn has been received, the transmitting node 120-T drives data onto the bus and looks for an ACK signal from the receiving node 120-R indicating that the initial data has been received and that more data can be sent. The ACK signal is an example of a multi-source/multi-sink network.

Under control of the Arbiter 150, one of the nodes 120 will drive the ACK signal and another node 120 will monitor the ACK signal. The ACK signal transmits information from any node 120 to any other node 120 over an ACK network in one clock period. The ACK signal must also return to an inactive state when no nodes 120 are using the bus. The implementation of the ACK network (and the distribution network for other multi-source/multi-sink control signals) requires the network to be returned to an inactive state if there is no active driver.

A number of techniques have been proposed or suggested for distributing multi-source/multi-sink control signals among various nodes 120 on a chip 100. Such multi-sourced networks are defined to be wired-OR or wired-AND circuits, and are commonly implemented with common-source or common-drain drivers using CMOS technology. A typical example is the interrupt signal (INT) of a microprocessor chip on a PCB sourced by several other chips. On the PCB, a single resistor pulls the INT network to the power supply voltage ($V_{DD}$) when all drivers are inactive. A driver may pull the INT signal towards $V_{SS}$ by turning on a transistor connected in the common-source mode. In the PCB environment, all drivers act independently and there is only one device monitoring the state of the INT network, but it is easily extended to an SoC example.

In the SoC environment of the present invention, the wired-OR technique discussed above may be attempted with a passive resistor or an active transistor. FIG. 2A illustrates a passive resistor implementation, where a pull-up resistor 215 may be located off of the SoC 210 (since high tolerance resistors are difficult to build on-chip) and connected to the wired-OR network 220 through a bond pad 225. Alternatively, the resistor could be implemented as either a strong always-on transistor and/or an active clamp transistor. FIGS. 2B and 2C illustrate active transistor implementations, where transistors 260, 280 may be located on of the SoC 250, 270 itself and connected to the wired-OR network 255, 275. For active transistor implementations, the strength of the pull-up device 260, 280 must be matched to the load and configuration of the wired-OR network 255, 275 such that the signal may be pulled down to $V_{SS}$ and restored to $V_{DD}$ in one clock period. A wired-AND solution would use complementary devices and supplies to those shown in FIGS. 2A–2C.

Generally, each control signal must be brought to a known state before a given device can drive the signal. In the implementation of FIGS. 2A through 2C, the pull-up devices 215, 260, 280 will return the signal state to a known, inactive state when no individual node 120 is driving the signal. Thereafter, an individual receiving node 120-R desiring to send an ACK signal must bring the ACK control line high to acknowledge receipt of data, and once the transmitting node 120-T receives the ACK signal, the receiving node 120-R must return the ACK line to a low state. However, such arrangements are not power efficient, and it is hard for a single node 120 on an SoC 210, 250, 270 to pull down the signal against the pull-up devices 215, 260, 280. In addition, the strength of the pull-up devices 215, 260, 280 in such implementations must be adjusted for process variations and operating conditions. Furthermore, the wired-OR and wired-AND techniques exhibit static power dissipation whenever the multi-source/multi-sink control signal is asserted. Finally, segments of the wired-OR network closest to the pull-up device will not be pulled to zero, reducing noise margins, particularly for low voltage operation.

A need therefore exists for an improved distribution network for multi-source/multi-sink control signals. A further need exists for a control signal distribution network that increases the information transfer rate. Yet another need exists for a control signal distribution network that provides improved scalability.

SUMMARY OF THE INVENTION

Generally, a method and apparatus are disclosed for distributing multi-source/multi-sink control signals in one clock period among a number of nodes on a chip. According to one aspect of the invention, each node assists in returning the control signal to an inactive state at the start of each cycle. Thus, since all nodes contribute to returning the control signal to the inactive state, the control signal returns to the inactive state more quickly, near the start of a given cycle, and the remainder of the cycle remains available for a given node to drive the control signal.

In the exemplary embodiment, each node on the chip includes a pulsed reset block. The pulsed reset block serves to discharge the control signal network closest to it for a short interval, and over time the rest of the network. In this manner, each node contributes to returning the control signal to an inactive state, if necessary, near the start of each cycle. In addition, once the control signal network has been returned to an inactive state, the control signal may then be driven by a node during the remainder of the cycle.

In addition, each node on the chip in the exemplary embodiment includes a gated control signal block that ensures that the node does not drive the control signal during the discharge interval when all the nodes are returning the control signal to an inactive state. In addition, the gated control signal block latches the control signal, which is the next state to be driven onto the control signal network. Optionally, only one node can assert the control signal in a given cycle.

The present invention overcomes RC effects on a global signal network that spans an SoC device and takes advantage of a synchronized clock that has been de-skewed to a high tolerance. Since all of the nodes connected to the control signal network assist in driving the control signal to the inactive initial state, this occurs in a shorter time interval than could be achieved with a single driver. Therefore, the majority of the cycle interval can be allocated to the individual drivers associated with the node(s) that must assert the control signal, e.g., drive the control signal to $V_{DD}$. Furthermore, the present invention provides improved scalability since an arbitrary number of nodes can be connected to the control wire without reconfiguring each block.

A more complete understanding of the present invention, as well as further features and advantages of the present invention, will be obtained by reference to the following detailed description and drawings.

DETAILED DESCRIPTION

Figure 1:
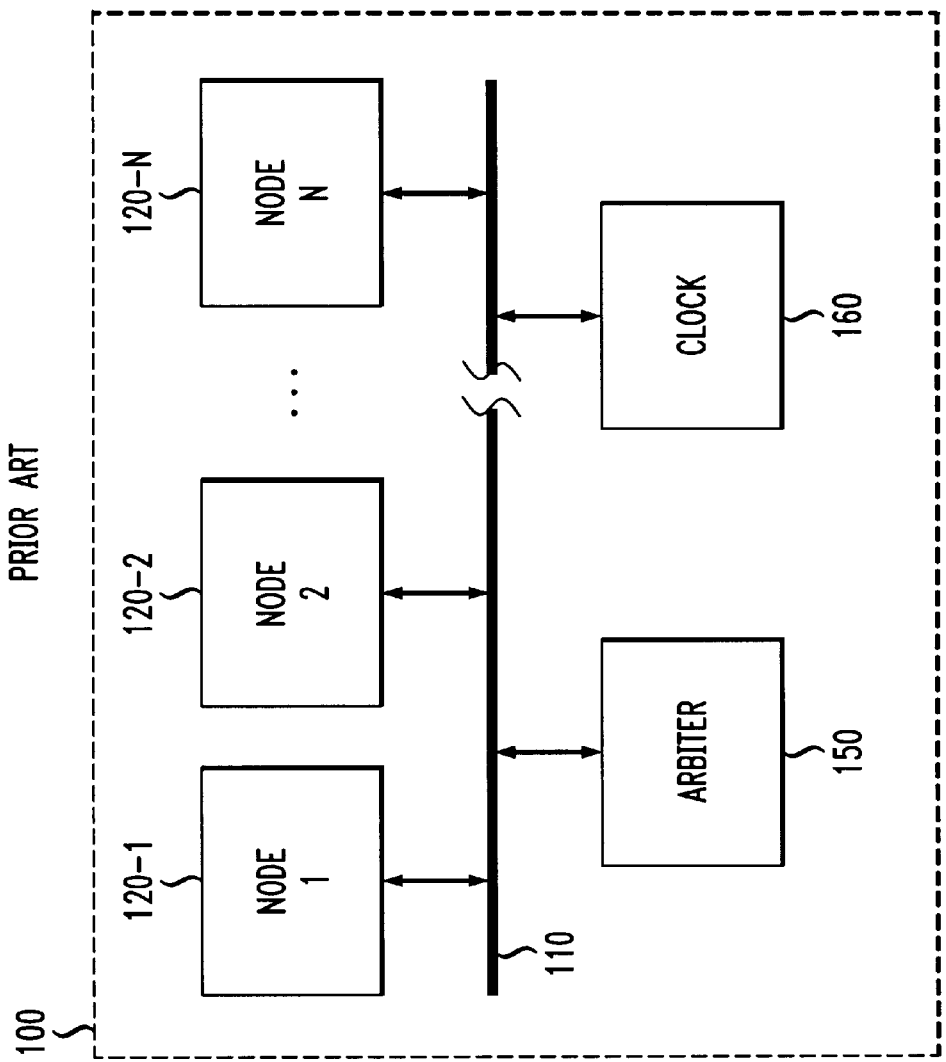
FIG. 1 is a schematic block diagram illustrating a conventional SoC where the present invention can operate.
Figure 2A:
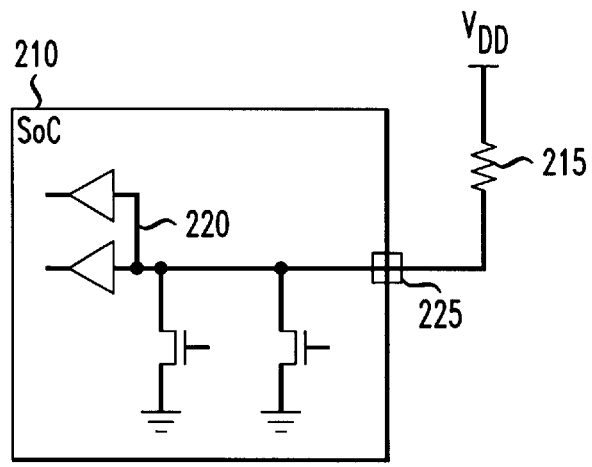
FIGS. 2A through 2C illustrate various implementations of conventional wired-OR networks for distributing multi-source/multi-sink control signals among various nodes on a chip.
Figure 2B:
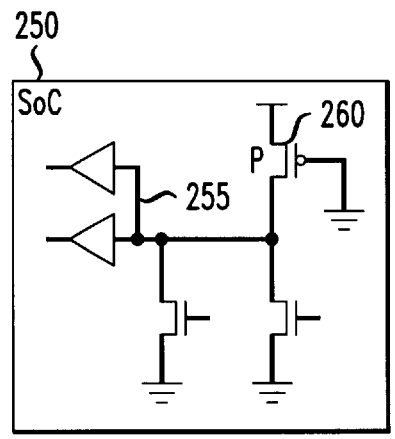
Figure 2C:
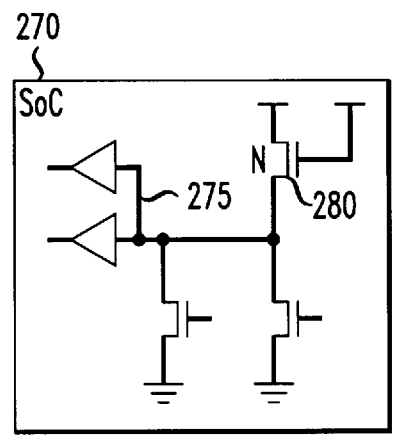
Figure 3:
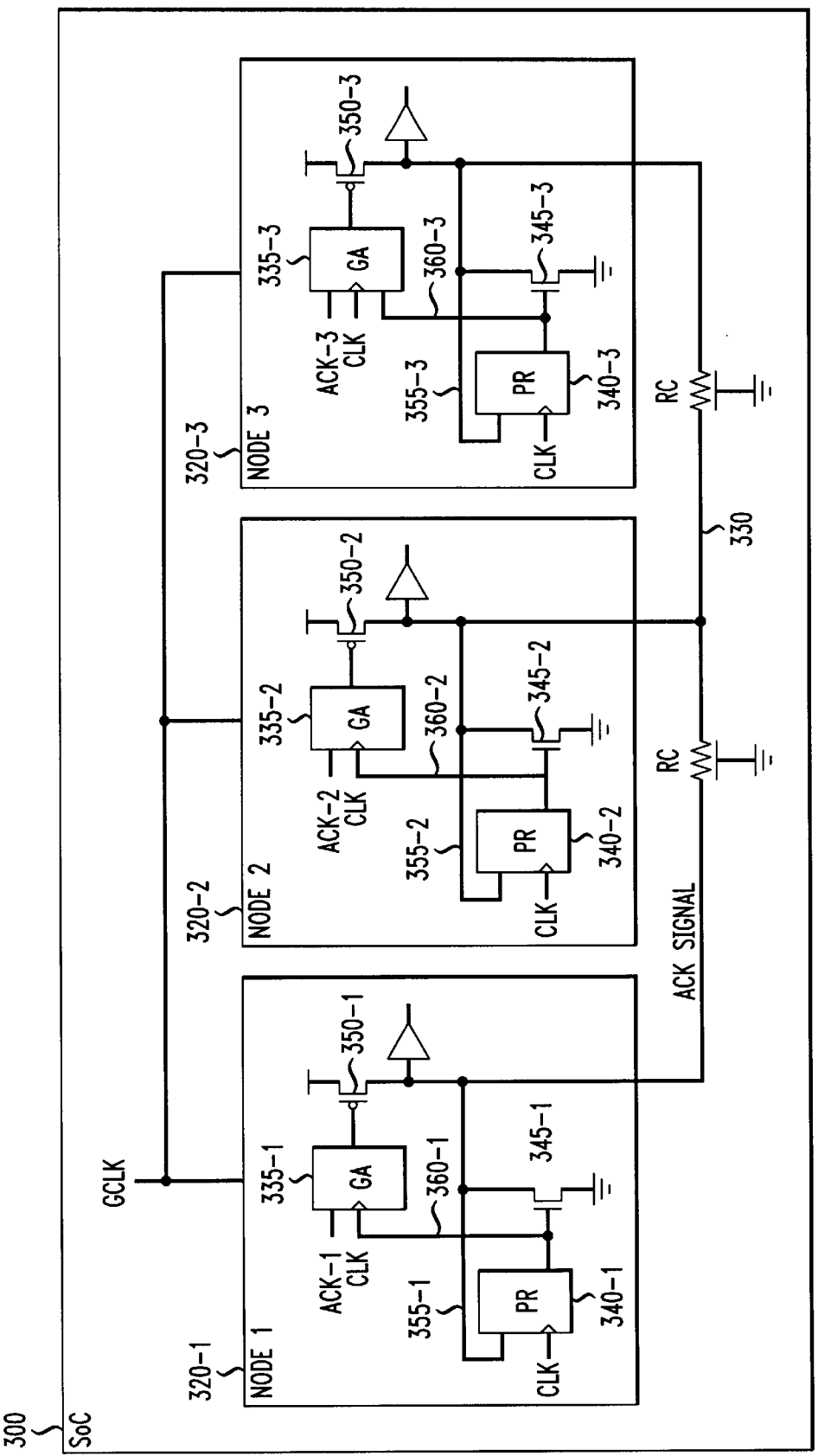
FIG. 3 is a schematic block diagram illustrating a network in accordance with the present invention for distributing a multi-source/multi-sink control signal among various nodes on a chip.

FIG. 3 is a schematic block diagram of a control signal network in accordance with the present invention for distributing a multi-source/multi-sink control signal in one clock period among various nodes 320-1 through 320-3, collectively referred to as nodes 320, on a chip 300. While the present invention is illustrated herein using the ACK signal on a SoC chip, the present invention is applicable to any control signal that may be driven by any node and which must be returned to an inactive state when not driven by any node, such as data-valid, interrupt and error signals, and to PCB devices as well. As shown in the exemplary embodiment of FIG. 3, three exemplary nodes 320-1 through 320-3 are connected by a common ACK network 330 that signals successful completion of a data transaction on a shared bus (not shown). The wires that make up the interconnection network 330 have a significant RC component that limits the rate at which information may be transferred. In addition, there is a system requirement to transfer information from one of the connected nodes 320-i to all of the other nodes 320 in one clock period. Only one node 320-i can be enabled to drive the control signal in any cycle and the control signal must be returned to an inactive state for any cycle for which there is no enabled driver.

The common ACK network 330 signals successful completion of a data transaction. Generally, if data is being transferred from Node-1 to Node-3 in a given cycle, for example, then Node-3 must assert the ACK signal in that cycle to inform Node-1 that the data was successfully received. According to a feature of the present invention, discussed further below, each node 320 assists in returning the ACK control signal to a known, inactive state, at the start of each cycle if necessary. Thus, since all nodes 320 contribute to returning the ACK signal to an inactive state, the ACK signal returns to the inactive state near the start of a given cycle, and the remainder of the cycle remains available for a given node 320-i to drive the control signal.

A global clock (GCLK) is distributed to all nodes 320 and a clock tree is carefully balanced to ensure that all of the local clocks (CLKs) are closely aligned over the expected operating conditions (voltage, temperature, process variations). Typically, the CLKs will be aligned to within ten percent (10%) of the clock period. All inter-node transfers are initiated by the rising edge of the local clock (CLK). For a discussion of a suitable technique for maintaining clock alignment, see United States Patent Application entitled "Method and Apparatus For Distributing a Self-Synchronized Clock to Nodes On a Chip," (Attorney Docket No. Lee 14-5-3), filed contemporaneously herewith, assigned to the assignee of the present invention and incorporated by reference herein.

Figure 4:
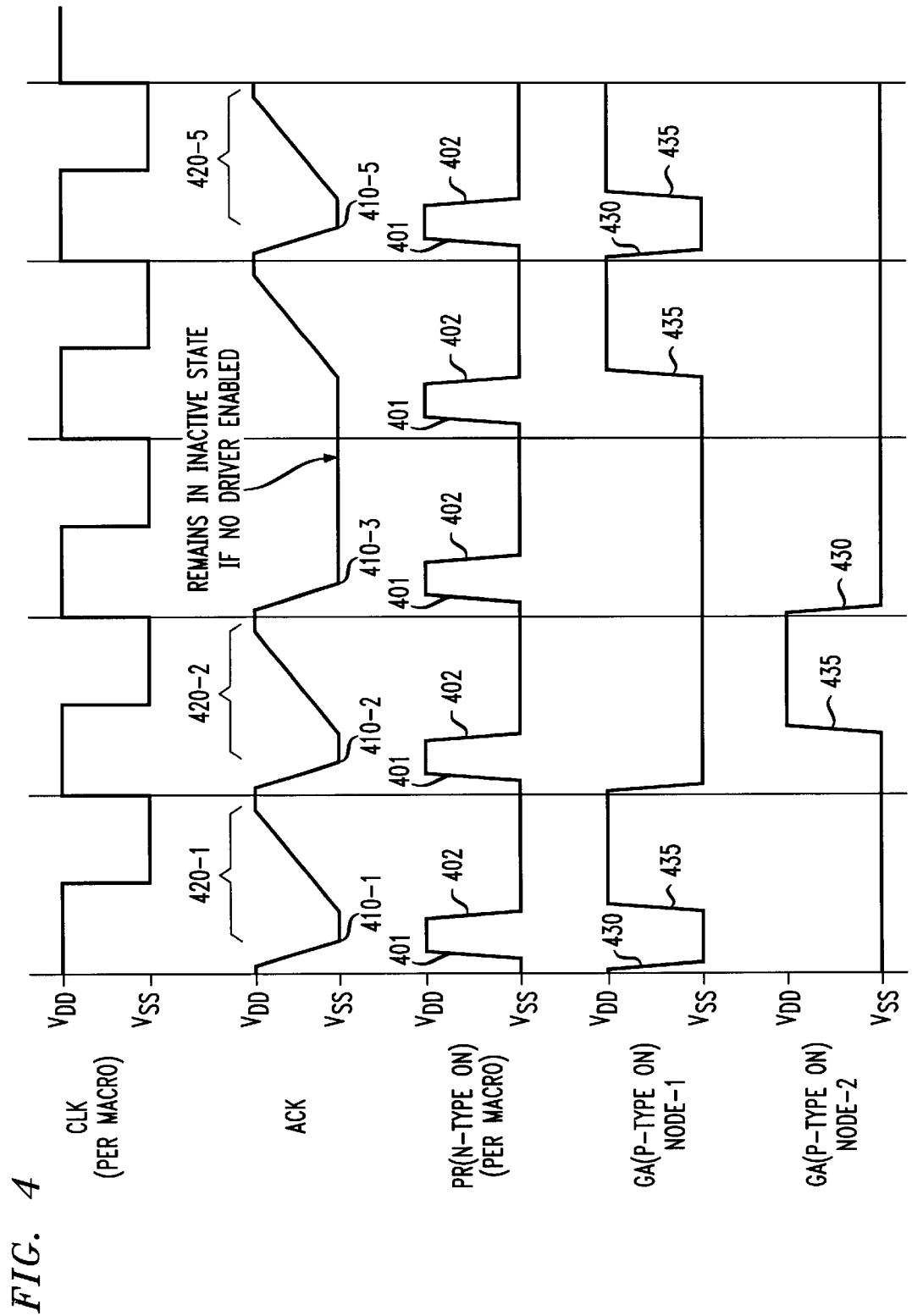
FIG. 4 illustrates the relative timing of various signals on the SoC chip shown in FIG. 3.

FIG. 4 illustrates the relative timing of various signals on the chip 300. In the following discussion, FIGS. 3 and 4 will be discussed in an integrated manner to describe the operation and relative timing of the various components and corresponding signals on the chip 300. In the example of FIG. 4, node-1 is driving the ACK signal in the first, fourth and fifth cycles, and node-2 is driving the ACK signal in the second cycle. No node is driving the ACK signal in the third cycle.

As shown in FIG. 3, each node 320 includes a gated ACK (GA) block 335 and a pulsed reset (PR) block 340. On each rising edge of the CLK signal (shown in FIG. 4), the PR block 340 generates a control signal to turn on the N-type transistor 345 at an instant 401 that in turn discharges the segment of the ACK network 330 closest to it, and over time the rest of the network 330. In this manner, each node 320 contributes to returning the ACK signal to a known, inactive state, if necessary, at an instant 410-n, near the start of each cycle n in accordance with one feature of the present invention. The ACK signal feeds back into the PR block 335 via line 355 and causes the reset control signal to turn off at an instant 402 when it has been pulled down below a predefined threshold value, such as. $V_{tn}$. Thus, the ACK control signal line may now be driven by any single node 320-i during the remainder of each cycle, such as the exemplary period 420 for cycle 1. Optionally, there could also be a weak feedback device (not shown) on the ACK network 330 to drive the signal to $V_{SS}$, and compensate for leakage and cross-coupling effects.

On the rising edge of the CLK signal, the GA block 335 generates a control signal at an instant 430 to turn off the P-type transistor 350 (assuming that it was turned on at an instant 435 in the previous cycle). By design, the P-type transistor 350 should turn off before the N-type transistor 345 turns on. This can be achieved, for example, by transistor sizing or by a logical interlock. Clock skew between the various nodes 320 may cause a P-type transistor 350 to be on at the same time as an N-type transistor 345 causing a direct current flow between $V_{dd}$ and $V_{ss}$, but the R component of the ACK network 330 will limit this current. In general, the P-type transistor 350 must remain off while the N-type transistors 345 are on (until instant 402 during each cycle), as determined by a feedback line 360 from the PR block 340 to the GA block 335. On the rising edge of CLK, the GA block 335 also latches the ACK-n signal, which is the next state to be driven onto the ACK signal network 330 during a period 420 in this cycle. One or more nodes 320 can assert ACK-n in a given cycle.

After the PR block 340 turns off the control signal at an instant 402 that enables the N-type device 345, the GA block 335 will turn on the associated P-type device 350 if the previously latched ACK-n signal is asserted. There must be sufficient delay before the turn on of the P-type device 350 to avoid the situation where the PR block 340 of one node 320-i is still driving the ACK network 330 to $V_{SS}$ when the node 330 asserting the ACK signal starts to drive the ACK signal to $V_{DD}$. Therefore, in the design of GA the circuit designer must allow for the maximum clock skew between the nodes 320.

The present invention overcomes RC effects on a global signal network 330 that spans an SoC device 300. The present invention takes advantage of the fact that the nodes 320 within the SoC 300 will use local clocks CLKs that have been de-skewed to a high tolerance. All of the nodes 320 connected to the network 330 assist in driving the control signal to the inactive state, such as $V_{SS}$. As shown in FIG. 4, this occurs in a shorter time interval than could be achieved with a single driver. Therefore, the majority of the cycle interval can be allocated to the individual driver associated with the node 320-I that must assert the control signal, e.g., drive the control signal to $V_{DD}$.

In CMOS technology, the trans-conductance of N-type devices is two to three times greater than that of P-type devices. In that case, a preferred embodiment might use P-devices to pull the ACK signal to $V_{DD}$ for the inactive state, and N-type devices would be used to assert the ACK signal by driving it to $V_{SS}$. Among other benefits of the present invention, is the use of a single wire interface in the control signal network 330 that is extensible to an arbitrary number of nodes. Thus, while adding an additional node increases the conductor length and associated RC effects, there is likewise an additional driver in the added node to help return the control signal to the inactive state.

It is to be understood that the embodiments and variations shown and described herein are merely illustrative of the principles of this invention and that various modifications may be implemented by those skilled in the art without departing from the scope and spirit of the invention.

We claim:

1. A method for distributing a shared control signal on a bus to a plurality of nodes, said control signal having two signal states, said method comprising the steps of:

activating said control signal during a first portion of a clock cycle and returning said control signal to an inactive state during second portion of said clock cycle using at least a plurality of said nodes; and permitting at least one of said nodes to drive said control signal to an active state during a remaining portion of said clock cycle.

2. The method of claim 1, further comprising the step of ensuring that only a single node connected to said bus can assert said control signal in a given clock cycle.

3. The method of claim 1, wherein each node operates synchronously with respect to a shared clock.

4. The method of claim 1, wherein said bus is on a system-on-chip.

5. The method of claim 1, wherein said bus is on a printed circuit board.

6. The method of claim 1, further comprising the step of ensuring that a node does not assert said control signal during said second portion of said clock cycle.

7. The method of claim 1, further comprising the step of synchronizing a distribution of a clock signal to each of said nodes.

8. The method of claim 7, wherein said synchronized clock signal is used to establish said clock cycles at each of said nodes.

9. A method employed by a first node on a chip for asserting a shared control signal on a bus, said control signal having two signal states, said method comprising the steps of:

cooperating with additional nodes to return said control signal to an inactive state during an initial portion of each clock cycle; and asserting said control signal during a remaining portion of a given clock cycle if said first node has control of said bus.

10. The method of claim 9, wherein said bus is on a system-on-chip.

11. The method of claim 9, wherein said bus is on a printed circuit board.

12. The method of claim 9, further comprising the step of ensuring that said first node does not assert said control signal during said initial portion of said clock cycle.

13. The method of claim 9, further comprising the step of receiving a clock signal that is synchronized to each of said nodes.

14. The method of claim 13, wherein said synchronized clock signal is used to establish said clock cycles.

15. A network for distributing a shared control signal on a chip having a plurality of nodes, said control signal having two signal states, said device comprising:
 a pulsed reset circuit in each of said nodes for returning said control signal network to an inactive state during an initial portion of a clock cycle using at least a plurality of said nodes; and
 a control signal assertion circuit that permits at least one of said nodes to drive said control signal to an active state during a remaining portion of said clock cycle.

16. The network of claim 15, wherein said chip is fabricated using CMOS technology, and wherein P-type CMOS devices are used to generate a first state of said control signal and N-type CMOS devices are used to generate a second state of said control signal.

17. The network of claim 15, further comprising a circuit that ensures that only a single device connected to said bus can assert said control signal in a given time interval.

18. The network of claim 15, wherein said chip is a system-on-chip.

19. The network of claim 15, wherein said chip is a printed circuit board.

20. The network of claim 15, wherein said network further comprises a network for distributing a synchronized clock to each of said nodes.

21. The network of claim 20, wherein said synchronized clock signal is used to establish said clock cycles at each of said nodes.

* * * * *